United States Patent [19]

Baskett

[11] Patent Number: 5,031,461
[45] Date of Patent: Jul. 16, 1991

[54] MATCHED PAIR OF SENSOR AND AMPLIFIER CIRCUITS

[75] Inventor: Ira E. Baskett, Tempe, Ariz.

[73] Assignee: Motorola, Inc., Schaumburg, Ill.

[21] Appl. No.: 474,882

[22] Filed: Feb. 5, 1990

[51] Int. Cl.⁵ ............................................. G01L 19/04
[52] U.S. Cl. .................................. 73/708; 29/621.1;
    73/721; 73/766; 338/3; 338/4
[58] Field of Search ................. 73/708, 721, 720, 726,
    73/727, DIG. 4, 754, 766; 338/4, 3, 42;
    29/621.1

[56] References Cited

U.S. PATENT DOCUMENTS 3,368,179 3/1966 Elliott ..................................... 338/3
4,355,537 10/1982 vander Have ....................... 73/708
4,618,397 10/1986 Shimizu et al. ..................... 156/628
4,777,826 10/1988 Rud Jr. et al. ........................ 73/708
4,864,463 9/1989 Shkedi et al. ........................ 361/283

Primary Examiner—Donald O. Woodiel
Attorney, Agent, or Firm—Joe E. Barbee; Robert M. Handy; Walter W. Nielsen

[57] ABSTRACT

A low-cost, quickly prototyped sensor circuit assembly comprises a sensor integrated circuit and an amplifier circuit, wherein all adjustable system resistors are located on the sensor integrated circuit in the form of adjustable thin-film resistive elements whose manufacture requires no new mask layers. An assembly method comprises trimming the sensor and amplifier circuit as a matched pair.

20 Claims, 3 Drawing Sheets

MATCHED PAIR OF SENSOR AND AMPLIFIER CIRCUITS

BACKGROUND OF THE INVENTION

1. Technical Field of the Invention

This invention relates generally to electronic sensor circuits, and, more particularly, to a sensor circuit assembly comprising a sensor integrated circuit and an amplifier circuit distinct from said sensor integrated circuit, wherein all system trim resistors are located on the sensor integrated circuit.

2. Background Information

The present invention has utility in electronic sensor circuits, especially in semiconductor pressure sensor circuits. Pressure responsive transducer circuits are utilized extensively in automobile engine control systems. For example, a manifold pressure sensor and amplifier circuit may provide an analog signal which varies with the engine manifold pressure. An analog-to-digital converter transforms the analog control signal into a digital control signal which is utilized by a microprocessor-controlled fuel injection system.

The operation of most semiconductor pressure transducers and op amps varies with temperature, requiring temperature-compensating techniques and circuitry. U.S. Pat. Nos. 4,326,171 and 4,463,274 disclose temperature-compensating circuits for pressure transducers.

Semiconductor transducer/amplifier circuits may be packaged in several ways. For example, they may be packaged on a printed circuit board. However, the customer is then responsible for performing the necessary trimming operations for temperature compensation and for adjusting the op amp gain. Customers typically may not be qualified or motivated to perform such work. Moreover, resistor temperature coefficients at the board level are not well matched, thus degrading system accuracy.

Another known package is a two-chip system comprising a sensor chip and a second custom chip containing thin-film resistors for temperature compensation and for calibrating and amplifying the output. However, the disadvantages of the two-chip system are that the custom integrated circuit must be redesigned for each advance or alteration in circuit or process technology. Nor can a two-chip system provide necessay flexibility in circuit configuration.

Yet another known package is a hybrid module, comprising a substrate on which is mounted a sensor chip, one or more amplifier chips, and suitable resistors and capacitors which are soldered to metal pads and wire-bonded to interconnecting metal traces. The resulting package may take the form of an encapsulated assembly with leads.

One disadvantage of hybrid modules is that they tend to be very labor intensive because each component has to be individually placed, connected, calibrated, and temperature-compensated.

It is also known to incorporate sensor circuits onto a single integrated circuit device. But even with a fully integrated circuit device it is necessary to adjust or "trim" on-chip passive elements for various purposes, such as setting the transducer offset voltage, the op amp input voltage offset, and resistive values.

An advantage of a fully integrated device is that all trim is performed on a system-wide basis. That is, the op amp gain is set at the same time that the sensor element temperature calibration step is performed. All components on the chip, including the sensor and op amps, are matched with respect to values and temperature coefficients. At trim, all values and temperature coefficients are set.

However, a disadvantage of such integrated circuit devices is that they have relatively long development cycles and are relatively expensive, especially in low-volume applications.

There is therefore a significant need in the semiconductor transducer field to provide customers with a fully system-ready product, which requires no trimming or adjustment by the customer or user. There is also a strong demand by customers for relatively low cost sensor circuits. In addition, customers desire short development cycles for prototype sensor systems, so it would be desirable to provide a sensor assembly that is easy to modify to meet the needs of different customer applications.

Therefore, there is a substantial need to provide a compact sensor assembly that is low in cost, high in quality, and which facilitates a short prototyping cycle and a short manufacturing cycle.

BRIEF SUMMARY OF INVENTION

The present invention fulfills the above-mentioned requirements by providing a sensor chip containing the desired trim resistors and a separate module containing only the amplifier(s). The amplifier module may take the form of a board or chip. All trim operations are performed at the factory on the combination integrated circuit/amplifier module.

Accordingly, it is an object of the present invention to provide matched sensor and amplifier circuits which have high reliability and yet which require no trimming operations by the customer.

It is another object of the present invention to provide matched sensor and amplifier circuits which are relatively inexpensive and which can be relatively quickly modified.

These and other objects are achieved in accordance with a preferred embodiment of the invention by providing a sensor assembly comprising an integrated circuit comprising a sensor having at least one output terminal and at least one adjustable element for temperature compensation or gain calibration, an amplifier circuit distinct from the integrated circuit and comprising at least one input and an output, and means for coupling the sensor output terminal to the amplifier circuit input.

BRIEF DESCRIPTION OF THE DRAWINGS

The invention is pointed out with particularity in the appended claims. However, other features of the intention will become more apparent and the invention will be best understood by referring to the following detailed description in conjunction with the accompanying drawings in which:

DESCRIPTION OF PREFERRED EMBODIMENT

Figure 1:
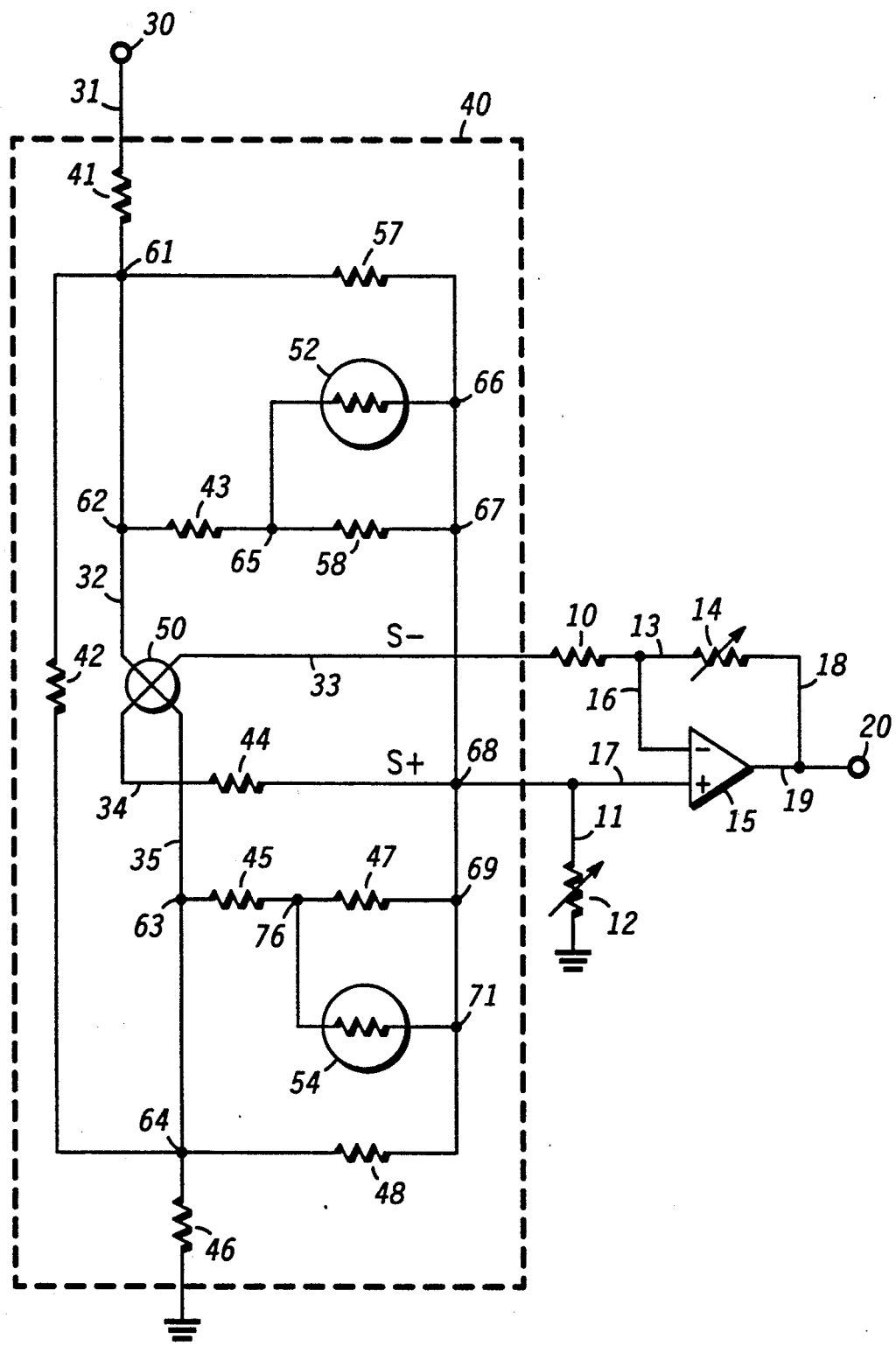
FIG. 1 shows a prior art circuit board sensor assembly comprising a sensor integrated circuit 40 and other electrical components including an op amp 15.

FIG. 1 shows a prior art circuit board sensor assembly comprising a sensor integrated circuit 40, including transducer 50, and other electrical components including an op amp 15 and trim resistors 12 and 14. Resistor 14 is used to adjust the gain of op amp 15, while resistor 12 is used to adjust the offset of op amp 15. As mentioned above, the sensor assembly shown in FIG. 1 has the disadvantage of requiring the customer or user to trim resistors 12 and 14. This can be a fairly complicated procedure because the assembly must be subjected to at least two different pressures at each of at least two different temperatures.

Because many users are not experienced circuit designers, they may encounter difficulties, since the prior art circuit board sensor assembly requires the user to design and characterize a specific circuit. In addition, the user must obtain and assemble the various components of the circuit board assembly.

Figure 2:
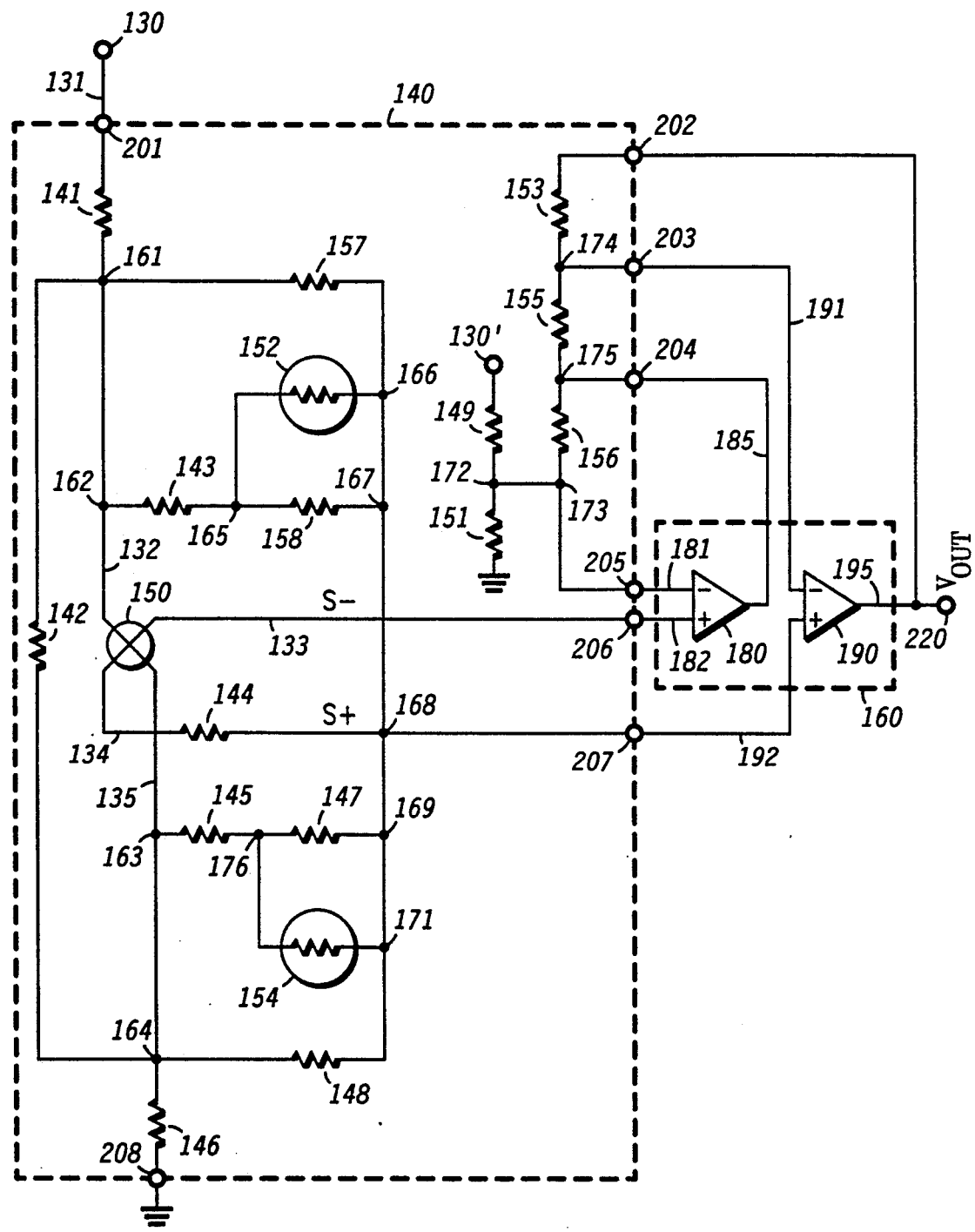
FIG. 2 shows a matched pair of sensor and amplifier circuits according to a preferred embodiment of the present invention, including sensor circuit 140 and amplifier circuit 160.

FIG. 2 shows a matched pair of sensor and amplifier circuits according to a preferred embodiment of the present invention, including sensor circuit 140 and amplifier circuit 160. Sensor circuit 140 is implemented as an integrated circuit having external terminals 201–208.

Sensor circuit 140 comprises a sensor transducer 150 having a positive output 134, a negative output 133, and excitation terminals 132 and 135. As is well known, an increase in pressure on transducer 150 creates a voltage differential across output terminals 133 and 134, the differential increasing proportional to the applied pressure.

Sensor circuit 150 also comprises temperature-compensating resistors, such as resistors 152 and 154. Resistors 152 and 154 are conveniently but not essentially provided as thin-film resistors. Any trimmable monolithic form of resistors may be used.

All of the trimmable, passive elements in the sensor assembly, including resistors 141–149, 151, 153, and 155–158 are provided on IC 140. Resistors 141–149, 151, 153, and 155–158 may also be thin-film resistors.

Amplifier circuit 160 comprises a pair of op amps 180 and 190, each having an inverting input (181, 191), a non-inverting input (182, 192), and an output (185, 195).

The negative output 133 of sensor 150 is coupled to the non-inverting input 182 of op amp 180 through terminal 206.

The positive output 134 of sensor 150 is coupled to the non-inverting input 192 of op amp 190 through terminal 207.

A resistor network comprises resistors 149, 151, 153, 155, and 156. Resistors 149, 151, and 156 form a resistive divider network which is used to set the temperature coefficient of the offset of op amp 180.

Resistor 149 is coupled between positive power supply terminal 130' and junction 172, and resistor 151 is coupled between junction 172 and ground. One side of resistor 153 is coupled via output terminal 202 to the output 195 of op amp 190, and the other side of resistor 153 is coupled to junction 174. One side of resistor 155 is coupled to junction 174, and the other side of resistor 155 is coupled to junction 175.

Junction 174 is coupled through output terminal 203 to the inverting input 191 of op amp 190.

One side of resistor 156 is coupled to junction 173 which is also coupled to junction 172, and the other side of resistor 156 is coupled to junction 175, which is coupled through output terminal 204 to the output of op amp 180.

Junction 173 is coupled through output terminal 205 to the inverting input 181 of op amp 180.

A positive supply voltage is applied to IC 140 at terminal 201. Terminal 208 is coupled to ground. And the circuit output voltage is produced at output terminal 220.

It should be understood that amplifier circuit 160 may be implemented either as a circuit board or integrated circuit.

The matched sensor-amplifier arrangement of FIG. 2 can be provided as two die in a single package, as a two-chip assembly, or as two packages marketed together in a single envelope.

It should also be understood that the trimmable passive components are located on sensor IC 140.

OPERATION OF PREFERRED EMBODIMENT

The operation of the circuit shown in FIG. 2 as pressure is applied to sensor 150 will now be explained.

After the circuit-trimming operation has been completed (see below), with no pressure applied the outputs at terminal 206 and 207 are nominally equal and remain so over the temperature range. As the temperature is raised, the networks comprising resistors 152 and 154 draw more or less current, causing the positive sensor output 134 to track the negative sensor output 133.

Again at room temperature, as pressure is applied, negative sensor output 134 increases in voltage causing the output of op amp 190 to increase. As the temperature is raised, the input resistance of sensor 150 increases, the resistance of thin-film resistors 141 and 146 remain nominally unchanged, and as a result the excitation voltage at 132 and 135 increases, compensating for the decrease in output per volt of sensor 150.

MANUFACTURING THE PREFERRED EMBODIMENT

The various steps that occur in trimming the sensor IC 140 after assembly and before it is shipped to the customer will now be described.

First, the thin-film resistors 141 and 146 are trimmed to compensate the sensor span for temperature. The span can be compensated for temperature, for example, over a range of between $-40°$ Centigrade to $125°$ Centigrade, with slightly less accuracy outside of that range.

Next resistor 143 or resistor 145 is trimmed to provide the absolute offset of sensor 150 at room temperature.

Then resistor 149 or 151 is trimmed to match the voltage at junction 172 to junction 175 at room temperature.

Next, the temperature is elevated to a higher temperature. Resistor 156 is then trimmed until output 220 returns to the room temperature absolute offset.

Finally, pressure is increased to a higher pressure. Then resistor 153 is trimmed until the correct output at 220 is produced.

DESCRIPTION OF ALTERNATIVE EMBODIMENT

Figure 3:
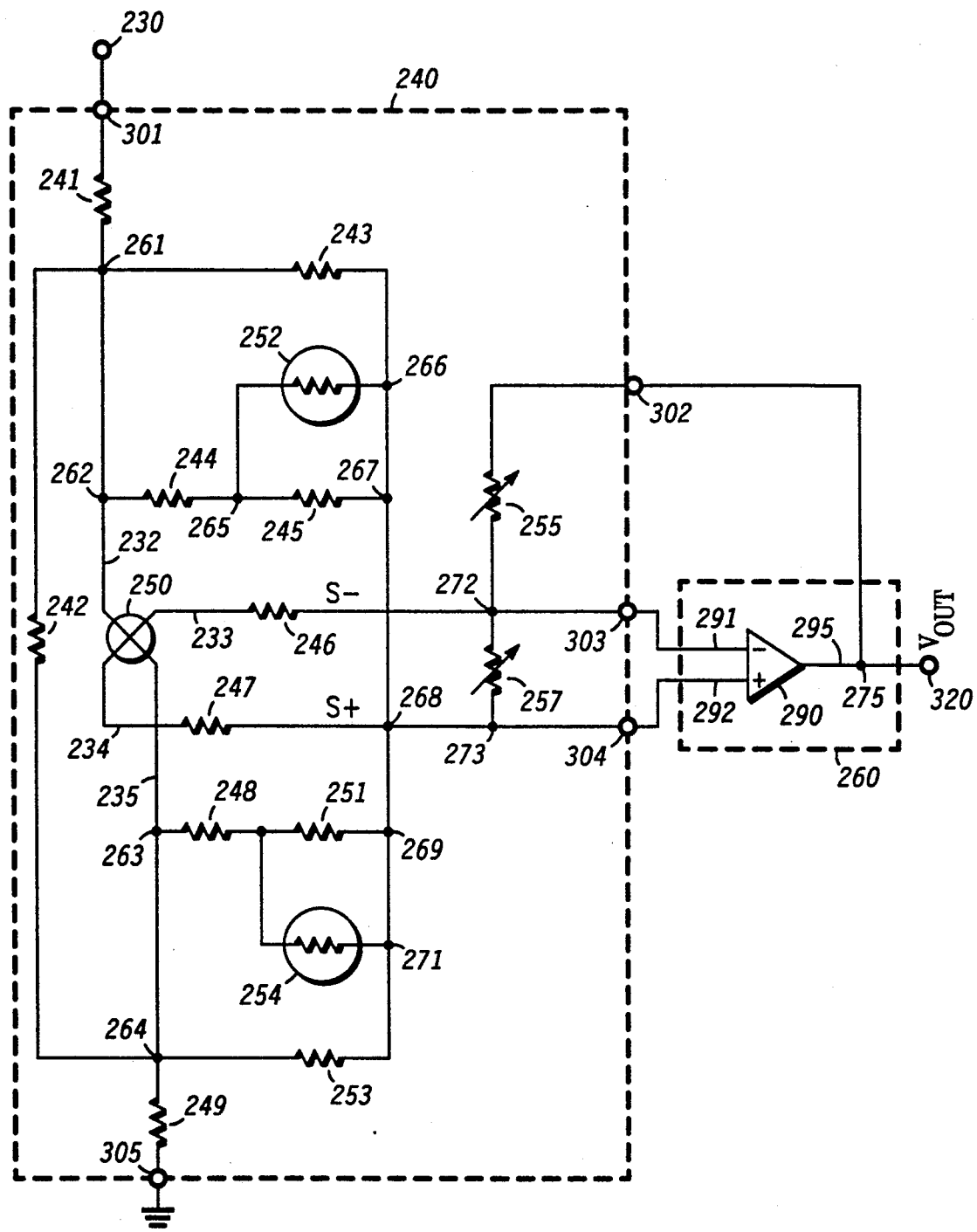
FIG. 3 shows a matched pair of sensor and amplifier circuits according to an alternative embodiment of the present invention, including sensor circuit 240 and amplifier circuit 260.

FIG. 3 shows a matched pair of sensor and amplifier circuits according to an alternative embodiment of the present invention, including sensor circuit 240 and amplifier circuit 260.

The basic concept seen in FIG. 2 also applies to the circuit of FIG. 3, wherein the trim elements are located on the sensor IC 240. But the sensor IC 240 is implemented slightly differently from sensor IC 140, and the amplifier circuit 260 comprises only one op amp 290 in this implementation.

Sensor IC circuit 240 comprises sensor transducer 250 having a positive output 234, a negative output 233, and excitation terminals 232 and 235. Circuit 240 also comprises monolithic temperature-compensating resistors 252 and 254 of, for example, thin-film resistive material.

Sensor circuit 240 also comprises trimmable resistors 241-249, 251, and 253. Also included are temperature-compensating resistors 252 and 254 and adjustable resistive elements 255 and 257. Thin-film resistors which may be laser-trimmed are preferred, but other trimmable resistor materials and other trimming techniques well known in the art may also be used.

Adjustable resistive element 255 is used to set the gain of op amp 290, and resistive element 257 is used to adjust the offset of op amp 290.

The output 275 of op amp 290 is fed back to the inverting input 291 via terminal 302, resistive element 255, junction 272 and terminal 303. The non-inverting input 292 of op amp 290 is coupled to one junction 273 of resistive element 257 via terminal 304. Junction 273 is also coupled to the positive output 234 of sensor 250 through junction 268 and resistor 247.

Sensor IC 240 has external terminals 301-305. A positive supply voltage is applied to IC 240 at terminal 301. Terminal 305 is coupled to ground. The circuit output voltage is produced at output terminal 320 of amplifier circuit 260.

MANUFACTURING THE ALTERNATIVE EMBODIMENT

The steps that occur in trimming the sensor IC 240 after assembly and before it is shipped to the customer will now be described.

First, the thin-film resistors 241 and 249 are trimmed to compensate the sensor span for temperature.

Next resistor 244 or resistor 248 is trimmed to provide the absolute offset of sensor 250 at room temperature.

Next, the temperature is elevated to a higher temperature, and resistors 245 and 251 are trimmed until output 320 returns to the room temperature absolute offset. Finally, pressure is increased to a higher pressure. Then resistor 255 is trimmed until the correct output at 320 is produced. As an option, resistor 257 can be adjusted to provide the absolute offset instead of trimming resistors 244 and 248.

It will be apparent that the present invention provides a straight-forward, inexpensive solution to the requirement for short development cycles, relatively easy modification, short production cycles. Only seven mask layers are required, and no epitaxial or isolation diffusions are required, since there are no transistors on the sensor IC.

Another advantage of the present invention is that by keeping the amplifier circuit off the sensor chip, the amplifier circuit can be mounted at a suitable distance from harsh environments to which the sensor IC may be exposed, e.g. the sensor may be mounted on an automotive engine manifold and the amplifier on the firewall.

It will also be apparent to those skilled in the art that the disclosed invention may be modified in numerous ways and may assume many embodiments other than the preferred form specifically set out and described above.

For example, the present invention can be extended to any type of transducer, such as accelerometers, flow meters, force sensors, load cells, chemical sensors, humidity sensors, Hall effect sensors, industrial microphones, etc.

It will be apparent that other signal-conditioning circuits could be used to supplement or substitute for the amplifier circuit (i.e. circuit 160 or 260).

Also, other temperature-compensating means could be used on the sensor IC in place of temperature-compensating resistors, such as diodes, active circuitry, or other temperature-compensating techniques.

Moreover, it will be understood that other resistor-trimming methods may be used, such as pulse-trimming.

In addition, the invention could be carried out by manufacturing the sensor IC, including trimming the resistors on the sensor IC, and putting the sensor IC's into inventory. At a later date, a sensor IC could be retrieved and matched with an amplifying circuit.

Moreover, the matching could be carried out by trimming the op amp(s) on the amplifying circuit, for example, by pulse-trimming the op amps.

It will be apparent that implant resistors could be used in addition to or in place of thin-film resistors on the sensor IC, and that such resistors could be trimmed using metal migration techniques.

Accordingly, it is intended by the appended claims to cover all modifications of the invention which fall within the true spirit and scope of the invention.

What is claimed is:

1. A matched sensor-amplifier assembly comprising:
    (a) a pressure sensing integrated circuit having individual chip-to-chip variation in pressure and temperature sensitivity, and electrical input and output, and comprising
        (i) a pressure sensor element, and
        (ii) at least two adjustable elements for temperature compensation and gain calibration;
    (b) an amplifier circuit distinct from said pressure sensing integrated circuit and also having individual chip-to-chip variation which may be different than the chip-to-chip variation of the pressure sensing integrated circuit, and comprising at least one input and an output, wherein the output also forms the output of the sensor-amplifier assembly;
    (c) means for coupling said pressure sensing integrated circuit input and output, respectively, to said amplifier circuit output and input; and
    wherein the value of the first adjustable element is chosen to minimize temperature variation of the output of the sensor-amplifier assembly as a whole and the value of the second adjustable element is chosen to provide, at a predetermined input pressure, a predetermined output from the sensor-amplifier assembly as a whole thereby forming the matched sensor-amplifier assembly.

2. A collectively matched sensor-amplifier combination comprising:
    (a) an integrated pressure sensing circuit comprising a sensor and having input and output terminals and at least one temperature-compensating means, at least one off-set compensating means and at least one gain compensating means;
    (b) an amplifier circuit distinct from said pressure sensing integrated circuit and comprising at least one input and an output; and
    (c) means for coupling said integrated pressure sensing circuit to said amplifier circuit; and (d) wherein each individual sensor-amplifier combination is temperature compensated by adjustment of said temperature compensating means and off-set compensated by adjustment of said off-set adjustment means and gain compensated by adjustment of said gain adjusting means, while said pressure sensing and amplifying circuits are coupled, thereby providing said collectively matched sensor-amplifier combination.

3. The sensor assembly recited in claim 2 wherein said one or more of said compensation means is a thin-film resistor.

4. A matched sensor-amplifier combination comprising:
   (a) an integrated circuit comprising a temperature sensitive sensor and having first and second outputs and a first and second adjustable resistive means;
   (b) an amplifier circuit comprising a first op amp having an inverting input, a non-inverting input, and an output;
   (c) first means for coupling said first integrated circuit output to said non-inverting input of said first op amp;
   (d) second means for coupling the output of said first op amp to said inverting input of said first op amp through said first resistive means of said integrated circuit; and
   (e) wherein the value of said first resistive means is adjusted while subjecting said sensor-amplifier combination to at least two predetermined temperatures to minimize temperature sensitivity of the sensor-amplifier combination when together and the value of said second resistive means is adjusted while the sensor of said sensor-amplifier combination is subjected to a predetermined pressure to provide a predetermined output from the sensor-amplifier combination when together.

5. The sensor combination recited in claim 4, wherein said sensor comprises a pressure transducer.

6. The sensor-amplifier combination recited in claim 4, wherein said first integrates circuit output is a negative output, and said second integrated circuit output is a positive output.

7. The sensor assembly recited in claim 4, wherein said integrated circuit further comprises a third adjustable resistive means; and wherein said amplifier circuit further comprises a second op amp having an inverting input, a non-inverting input, and an output;
   (f) third means for coupling said second integrated circuit output to said non-inverting input of said second op amp; and
   (g) fourth means for coupling the output of said second op amp to said inverting input of said second op amp through said third adjustable resistive means of said integrated circuit, whereby said third adjustable resistive means is adjusted while subjecting the sensor of said sensor-amplifier combination to a predetermined pressure.

8. The sensor assembly recited in claim 7, wherein said first integrated circuit output is a negative output, and said second integrated circuit output is a positive output.

9. A collectively matched sensor-amplifier matched pair comprising:
   (a) an integrated circuit comprising a sensor and having first and second outputs, first and second excitation terminals, and a first adjustable resistive means coupled between said first and second outputs and a second adjustable resistive means coupled to said second output;
   (b) an amplifier circuit comprising an op amp having an inverting input, a non-inverting input, and an output;
   (c) first means for coupling said first integrated circuit output to said non-inverting input of said op amp;
   (d) second means for coupling said second integrated circuit output to said inverting input of said op amp;
   (e) third means for coupling the output of said op amp to said inverting input of said op amp; and
   (f) wherein the value of said first adjustable resistive means is set to provide a predetermined output off-set from the sensor-amplifier pair when together and the value of the second adjustable resistive means is set to minimize the temperature variation of the output of the sensor-amplifier pair when together, thereby forming the collectively matched pair.

10. The matched pair recited in claim 9, wherein said first adjustable resistive means is adjusted while subjecting said sensor to at least two predetermined temperatures.

11. The matched pair recited in claim 9, and further comprising:
   (g) third adjustable resistive means coupled between said first adjustable resistive means and a junction, and wherein said third coupling means is coupled to said inverting input of said op amp through said junction.

12. The matched pair recited in claim 11, wherein said third adjustable resistive means is adjusted while subjecting the sensor of said sensor-amplifier assembly to a predetermined pressure.

13. A method of manufacturing a a collectively matched pair of sensor and amplifier circuits having predetermined temperature and output characteristics, wherein said method comprises:
   (a) providing an integrated circuit comprising a sensor and having input and output terminals and at least one adjustable element for temperature compensation and a further adjustable element for gain calibration to set the output of the matched pair in response to a predetermined pressure input;
   (b) providing an amplifier circuit distinct from said integrated circuit and comprising at least one input terminal and an output terminal;
   (c) coupling said sensor output and input terminals, respectively, to said amplifier input and output terminals to form a collective pair; and
   (d) while said sensor circuit and said amplifier circuit are coupled together, adjusting said adjustable temperature compensation element while subjecting said sensor assembly to a predetermined temperature and adjusting said gain calibration element while subjecting said sensor to a predetermined pressure, thereby forming said collectively matched pair with predetermined temperature and output characteristics.

14. The method according to claim 13, wherein steps (c) and (d) are performed substantially contemporaneously and substantially later in time than steps (a) and (b).

15. The method according to claim 13, wherein step (a) further comprises providing an additional compensation element for determining zero pressure off-set and step (d) further comprises adjusting the off-set compensation element to provide a predetermined zero pressure off-set for the matched pair.

16. The method according to claim 13, wherein in step (b) said amplifier circuit is an integrated circuit.

17. A method of manufacturing a matched sensor-amplifier pair which together have predetermined output characteristics, wherein said method comprises:
   (a) providing an integrated circuit comprising a sensor having first and second outputs and adjustable first and second resistive means coupled to said first output;
   (b) providing an amplifier circuit comprising an op amp having an inverting input, a non-inverting input, and an output;
   (c) coupling the output of said op amp to said inverting input of said op amp through said first resistive means and said sensor second output to said non-inverting input of said op amp to form an unmatched sensor-amplifier pair; and
   (d) while said circuits are coupled to form said unmatched sensor-amplifier pair, adjusting said first resistive means while subjecting at least said sensor to a predetermined temperature and said second resistive means while subjecting at least said sensor to a predetermined pressure, thereby providing a matched pair having predetermined output characteristics.

18. The method according to claim 17, wherein in step (a) said adjustable first resistive means is temperature-compensating.

19. The method according to claim 17, wherein step (a) further comprises providing a third resistive means coupled between the first and second outputs of the sensor and step (d) further comprises adjusting said third resistive means to establish the off-set of the output of the matched sensor-amplifier pair.

20. A method for providing a temperature-compensated and matched, sensor-amplifier assembly comprising:
   (a) providing a first semiconductor chip comprising a sensing element and a temperature-compensating element, a gain controlling element and an off-set controlling element coupled to the sensing element and an output of the first semiconductor chip;
   (b) providing a second semiconductor chip comprising an amplifying element with input and output, wherein the input and output of the second chip are coupled to the first chip to form the sensor-amplifier assembly, and the output of the second chip is also the output of the sensor-amplifier assembly; and
   (c) adjusting the temperature-compensating element, the gain controlling element and the off-set controlling element while the sensor-amplifier assembly is together, thereby forming a matched sensor-amplifier assembly whose output as a whole is substantially temperature-independent over a predetermined temperature range and which has predetermined overall off-set and gain when together as a matched sensor-amplifier assembly.

* * * * *